United States Patent [19]

Bellhouse

[11] Patent Number: 4,636,309
[45] Date of Patent: Jan. 13, 1987

[54] TRANSFER MEMBRANE APPARATUS

[76] Inventor: Brian J. Bellhouse, The Lodge, North Street, Islip, Oxfordshire OX5 2SQ, United Kingdom

[21] Appl. No.: 629,838
[22] PCT Filed: Dec. 7, 1983
[86] PCT No.: PCT/GB83/00324
§ 371 Date: Jun. 29, 1984
§ 102(e) Date: Jun. 29, 1984
[87] PCT Pub. No.: WO84/02275
PCT Pub. Date: Jun. 21, 1984

[51] Int. Cl.⁴ .............................................. B01D 13/00
[52] U.S. Cl. .................................. 210/321.3; 210/356
[58] Field of Search .................. 210/500.2, 356, 321.1, 210/321.2, 321.3, 321.4

[56] References Cited

U.S. PATENT DOCUMENTS

| | | | |
|---|---|---|---|
| 3,724,673 | 4/1973 | Ryon | 210/500.2 |
| 3,907,687 | 9/1975 | Hoeltzenbein | 210/321 |
| 3,910,841 | 10/1975 | Esmond | 210/321.3 X |
| 4,075,091 | 2/1978 | Bellhouse | 210/19 |
| 4,115,273 | 9/1978 | Winstead | 210/321.3 |
| 4,351,797 | 9/1982 | Bellhouse et al. | 210/321.3 X |
| 4,357,239 | 11/1982 | Bellhouse et al. | 210/356 X |
| 4,383,921 | 5/1983 | Bellhouse et al. | 210/356 X |
| 4,447,326 | 5/1984 | Riede et al. | 210/321 |

FOREIGN PATENT DOCUMENTS

| | | | |
|---|---|---|---|
| 2842118 | 4/1979 | Fed. Rep. of Germany | 210/321.3 |
| 2754220 | 6/1979 | Fed. Rep. of Germany | 210/321.3 |
| 2810949 | 10/1979 | Fed. Rep. of Germany | 210/321.3 |
| 2368284 | 10/1977 | France | 210/321.3 |
| 2370497 | 11/1977 | France | 210/321.3 |

OTHER PUBLICATIONS

WO80/01042, Bellhouse et al., 5-1980.

Primary Examiner—Frank Spear
Attorney, Agent, or Firm—Jeffers, Irish & Hoffman

[57] ABSTRACT

A membrane assembly, for use in mass or heat transfer or filter apparatus, comprises a pair of generally parallel plates (7) spaced apart with a profiled surface of one plate facing a similarly profiled surface of the other plate. A pair of sheets of transfer membrane material (6) are positioned closely spaced face to face between the plates with each sheet supported by and partially nesting in the profiled surface of the adjacent plate. The two membrane sheets thus provide a conduit (5) for one fluid. Between each sheet and the adjacent plate is formed a conduit for the second fluid. In use each sheet presents in its surface facing the other sheet a regular array of close packed depressions (14) which partically nest in corresponding depressions (9) in the respective plates (7).

5 Claims, 6 Drawing Figures

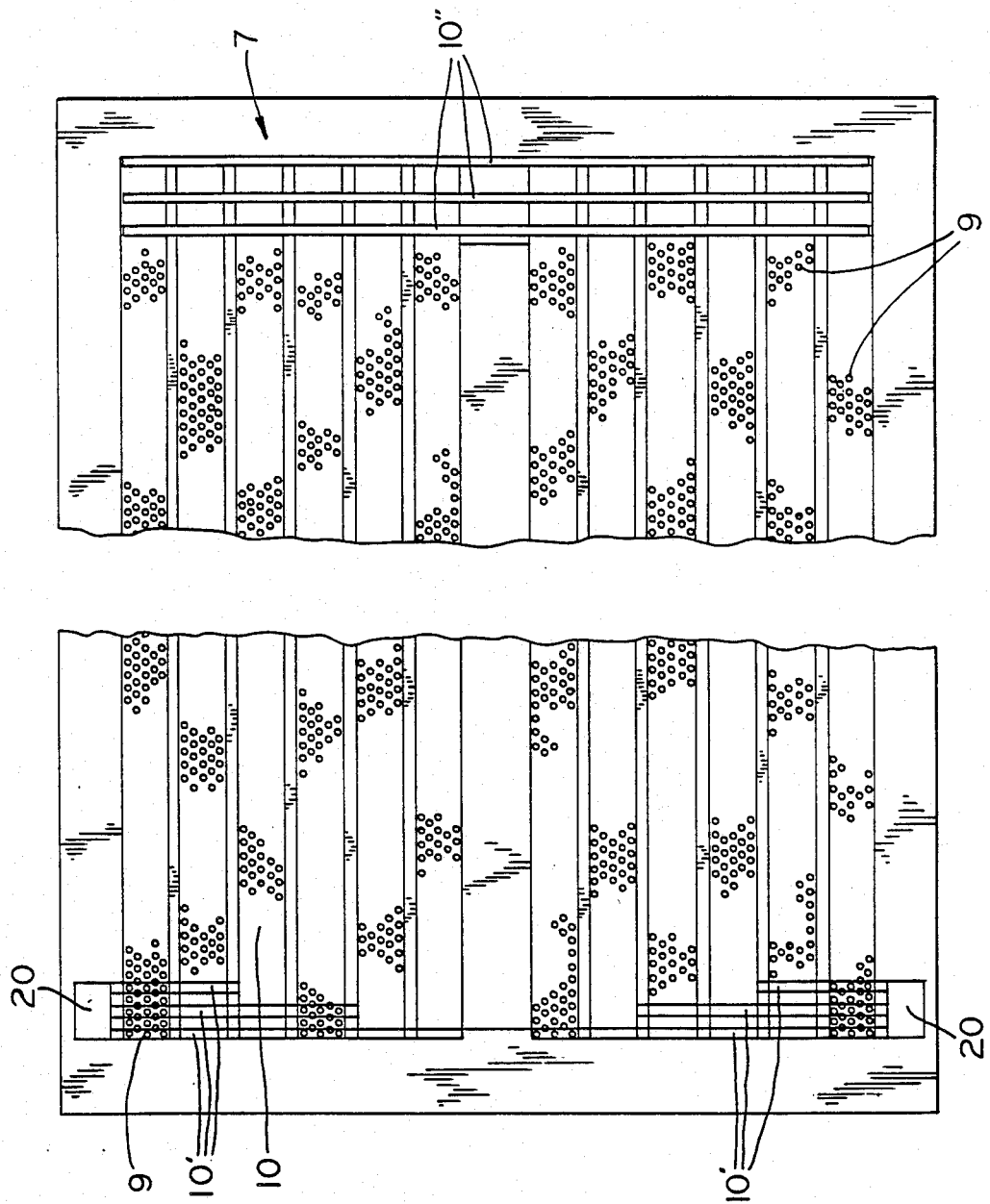

TRANSFER MEMBRANE APPARATUS

The invention relates to apparatus for effecting transfer of heat or mass between two fluids, of which at least one is usually a liquid, through a transfer membrane. Such apparatus is used in blood oxygenators and dialysers, in which case one fluid is blood and the other is oxygen or dialysate. In practice the efficiency of the transfer across the membrane is limited by the extent to which the total volume of fluid can be brought into close proximity with the membrane.

GB-A-No. 1,442,754 describes an apparatus wherein the membrane surface exposed to the fluid in one of the conduits is provided with a regularly repeating array of hollows, and there is superimposed on the mean flow of fluid through the conduit a pulsatile component which promotes vortex mixing of the fluid in the hollows.

It has been proposed to provide the conduit, in which the vortex mixing occurs, between two closely spaced generally planar sheets of transfer membrane material, in at least one of which the hollows are formed. The hollows proposed were then furrows extending transversely to the pulsatile component in the fluid flow. The furrows may be preformed in the membrane or produced by initial stretching of the membrane by fluid in the conduit whilst the membrane is supported externally against a profiled support plate. In that case a conduit for the second fluid is provided between the membrane and the support plate. These are advantages however in providing the conduits, in which the vortex mixing is promoted, in the form of axisymmetric tubular conduits having a series of larger cross-sectional bulbous portions connected by smaller cross-sectional neck portions. However, such tubular conduits are difficult to mount in the apparatus. GB-A-No. 2,042,926 discloses a technique for making an integral array of tubular conduits by sealing together two sheets, of which at least one is transfer membrane material, along a series of sinuous lines extending generally in the same direction alongside one another, with the undulations of adjacent lines out of phase with one another. This provides a generally planar compact nesting array of conduits. Each bulbous portion of each conduit is positioned between neck portions of adjacent conduits. However problems arise in sealing, e.g. by means of heat, the delicate transfer membrane material. Also, narrow crevices tend to be formed along the sides of the conduit adjacent to the seal lines and these provide possible locations for blood to collect and clot.

In accordance with the present invention, a membrane assembly for use in mass or heat transfer or filter apparatus, comprises a pair of generally parallel plates spaced apart with a profiled surface of one plate facing a similarly profiled surface of the other plate; and a pair of sheets of transfer membrane material closely spaced face to face between the plates with each sheet supported by and partially nesting in the profiled surface of the adjacent plate, to provide between the membranes a conduit for one fluid and, between each sheet and the adjacent plate a conduit for the second fluid; whereby in use each sheet presents in its surface facing the other sheet a regular array of close packed depressions. Preferably, each of the depressions faces a similar depression in the other sheet.

Surprisingly this geometry provides extremely good fluid dynamics in the conduit between the two membrane sheets. Specifically, since the membrane sheets are spaced, at least slightly, throughout the majority of their areas, hydraulic resistance is low, and yet adequate vortex mixing can be promoted in the depressions with a small pulsatile component of flow superimposed upon the mean flow of fluid through the conduit. Even compared with apparatus in which the liquid flow rate is already turbulent, ie. with Reynold's numbers of say greater than 15,000, with the apparatus of the invention there is an effective trebling of the mass transfer rate. When the fluid is blood, the positive spacing of the membrane sheets, substantially throughout their whole area, minimizes the existence of any places where stagnation and clotting of blood may occur.

Although the apparatus is primarily designed for mass or heat transfer, it could also be used in filtration apparatus, for example for filtering off small blood cells and plasma, with the liquid supplied under greater pressure than in conventional transfer applications. The invention overcomes the problems associated with concentration polarization which in conventional filtration apparatus for say blood, prevents the small cells from passing through the filter. In such apparatus a single membrane sheet may be provided on the inside of a tubular support which is profiled on its inside, the depressions in the membrane sheet lying in similar depressions which form the profiling in the support.

In a preferred construction, the depressions in each membrane sheet are close packed by being provided in rows extending side by side to one another along the direction of mean flow through the conduit, the depressions in adjacent rows being longitudinally offset halfway between adjacent depressions in the adjacent rows so that lateral nesting of adjacent rows occurs. This arrangement will be seen to be analogous to that disclosed in GB-A-No. 2,042,926 which suggests that the profiled surfaces of the support plates may be provided with sinuous ribs extending side by side along the conduit with the undulations in adjacent ribs out of phase with one another. However, the production of support plates with such sinuous ribs would be expensive by moulding or otherwise.

I find that in fact it is sufficient if the profiled surfaces of the plates are formed by drilling or otherwise providing part-spherical depressions in alignment with the depressions in the membrane sheet. In order to prevent the partial nesting of each membrane sheet in the part spherical depression in the respective support plate from sealing one support plate depression from the next, and hence the passage of the second fluid through the second conduit between the membrane sheet and adjacent plate, the depressions in the plate are preferably interconnected by shallow grooves. This enables free passage of the second fluid and, if the depressions are arranged in longitudinal rows, the grooves preferably interconnect one depression to the next along the respective row. This enables the second fluid to be passed in countercurrent to the first fluid and also has the advantage that the membrane sheet can partially nest in the groove and provide a less restricted passage for the one fluid through the one conduit between the membrane sheets. Transversely extending grooves may also be provide across the rows to prevent stagnation along a whole row resulting from blockage of a single depression in that row.

The depressions in each membrane may be formed by pre-embossing the membrane sheets, using heat and pressure, if for example they are made of a thermoplastic material such as polypropylene. Alternatively, the sheets may be stretched and shaped in situ by being partially forced into the profiling of the support plates, utilizing a hot liquid under presssure when the apparatus is first assembled.

The construction described is particularly useful for a blood oxygenator, in which blood will be the one liquid passed with a pulsatile flow through the one conduit between the membrane sheets, and oxygen will be the second fluid passed through the two second conduits in countercurrent to the blood. Experiments have shown that, when the blood is perfused with an ordinary roller pump, both oxygen and carbon dioxide are transferred at about 200 $ml.min^{-1}.m^{-2}$. When reversing pulsatile flow, i.e. flow in which the superimposed pulsatile component is sufficient to cause once each cycle a slight reversal in the flow of blood, in the direction opposite to the mean flow, gas transfer increased up to 450 $ml.min^{-1}.m^{-2}$. This is a higher gas transfer than I have obtained with any other apparatus of the kind described. The gas transfer rates referred to above were both obtained with a minimum membrane sheet separation of 0.5 mm.

One example of apparatus incorporating a membrane assembly according to the present invention will now be described with reference to the accompanying drawings, in which:

FIG. 2B shows a plan view of a plate used in the apparatus;

FIG. 5 is a detailed sectional view of a pair of plates of the apparatus shown in FIG. 1 with the membrane between.

Figure 1:
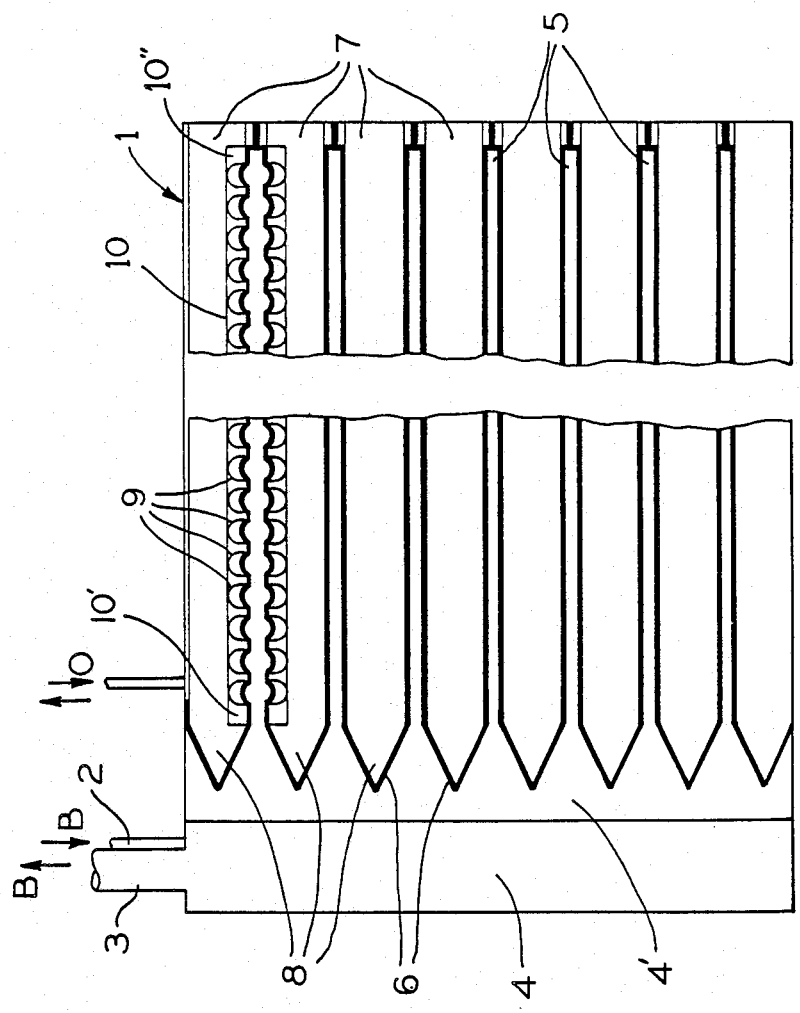
FIG. 1 shows a side sectional elevation of the apparatus.

The apparatus shown in FIG. 1 forms part of an artificial lung and has a rectangular housing 1 with an inlet 2 and outlet 3 through which blood is fed to the housing. Manifolds, separated by a wall 4 with a rubber sealing portion 4', enable blood to be supplied to a stack of U-shaped conduits 5 formed by a polypropylene microporous membrane 6 which is disposed in a sinuous folded path around the front of and between a plurality of stacked, spaced apart, plates 7. Each of the plates 7 is injection moulded from polycarbonate and has a tapered front end 8 which provides faired inlet and outlet portions to the U-shaped conduits 5 formed between the plates 7 by the membrane 6.

Figure 2A:
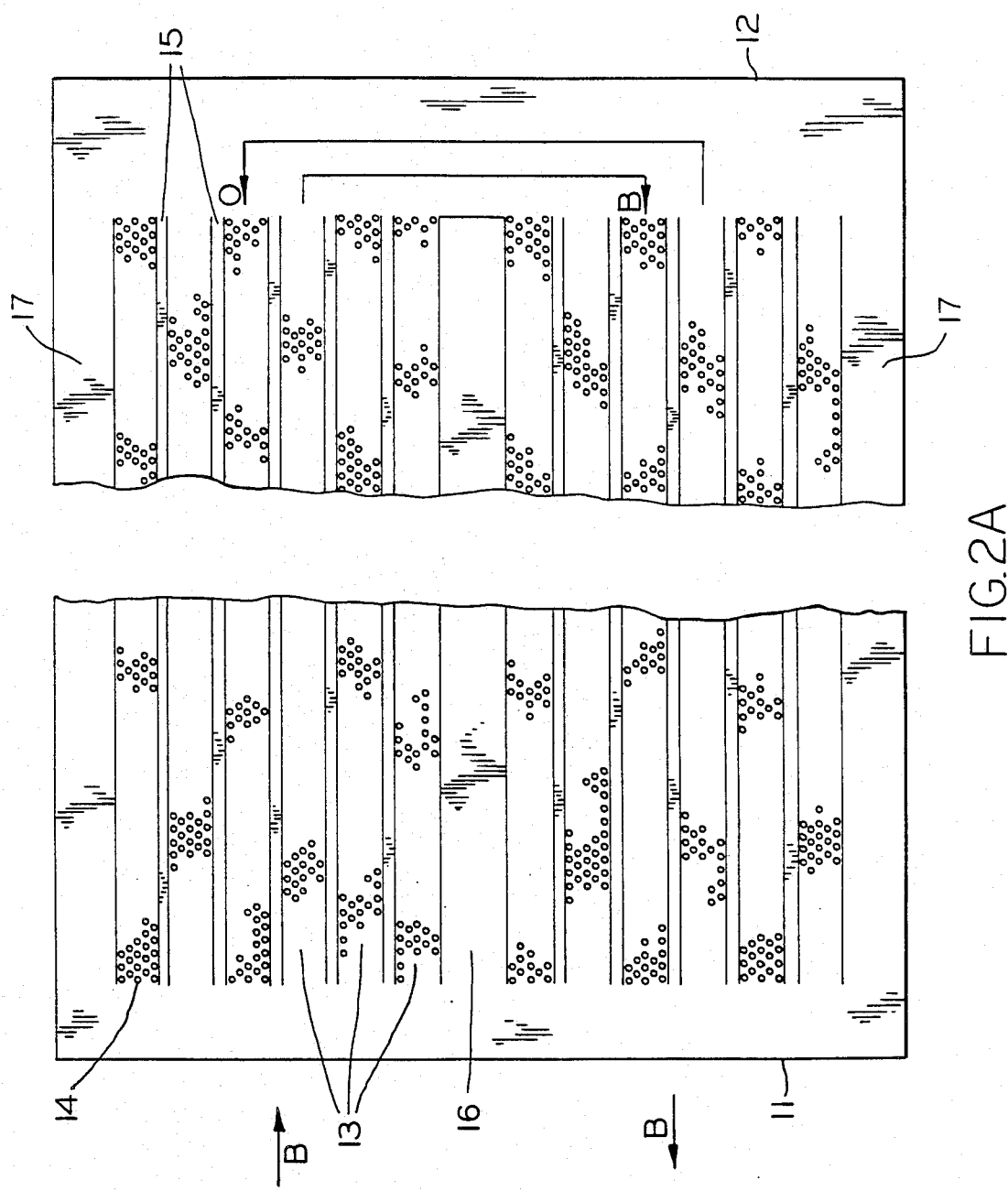
FIG. 2A shows a plan view of a membrane of the assembly according to the invention.
Figure 3:
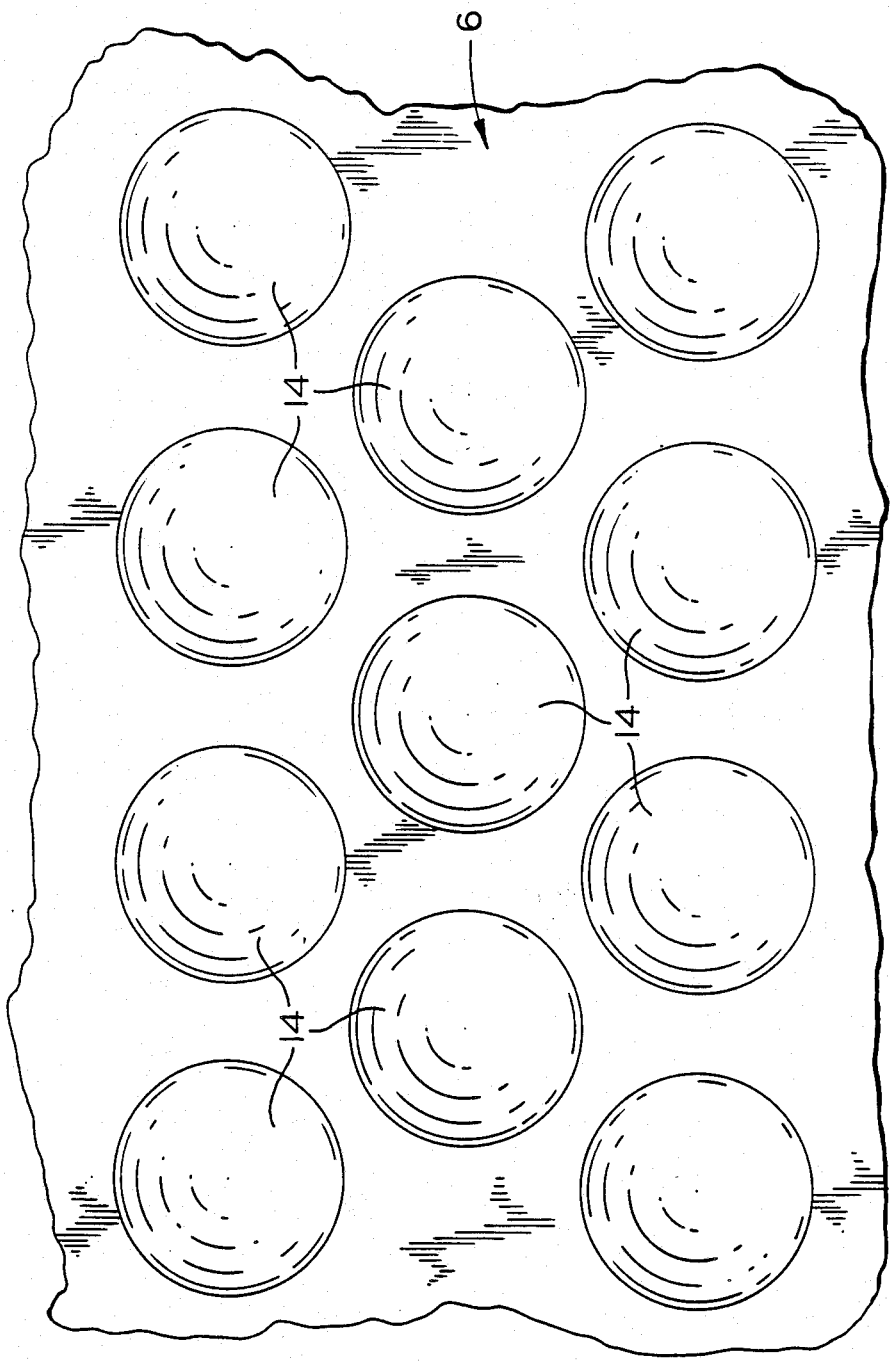
FIG. 3 shows, in plan, a part of the membrane in greater detail.
Figure 4:
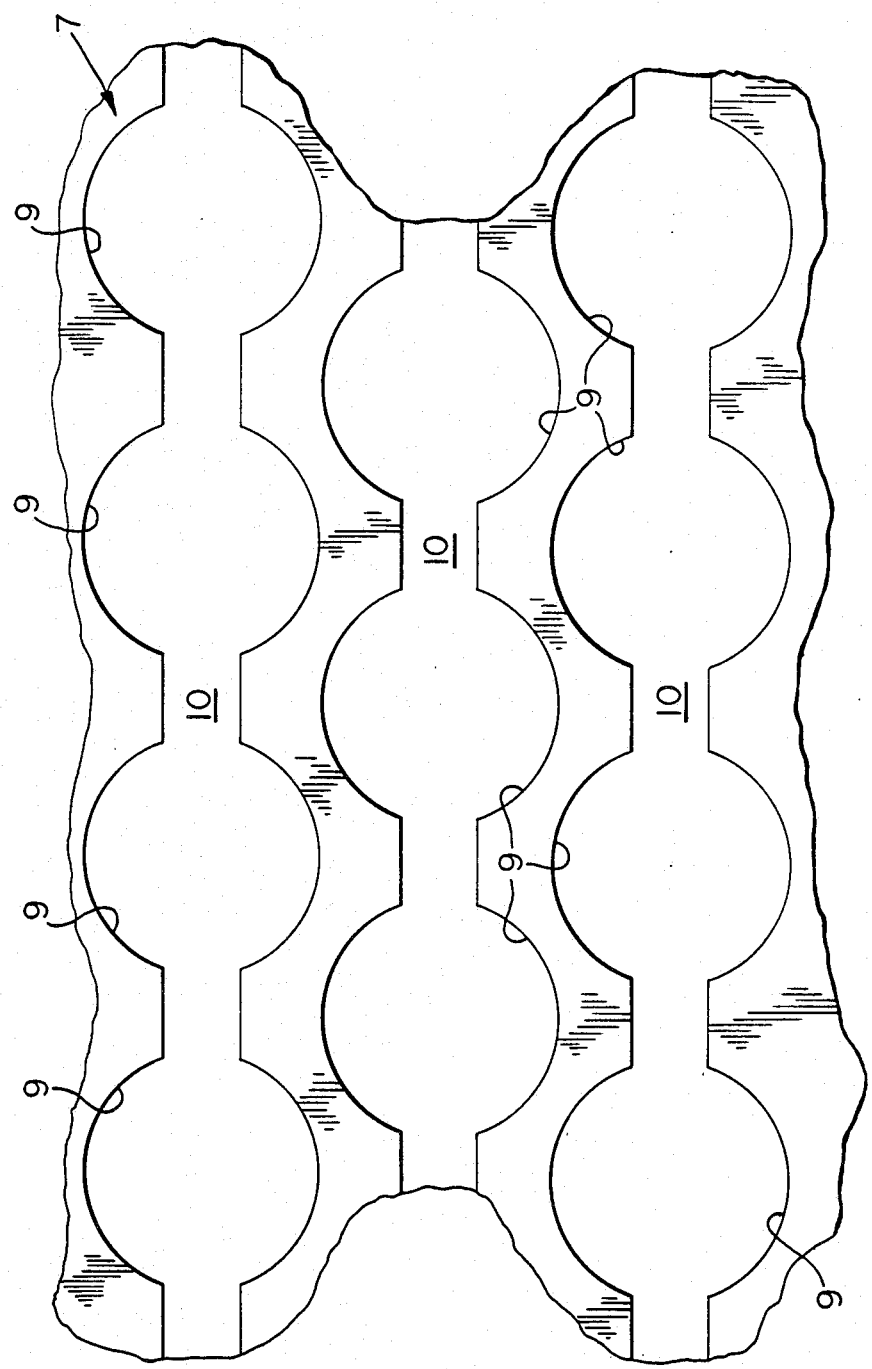
FIG. 4 shows, in plan, part of a support plate for the membrane in greater detail.
Figure 5:
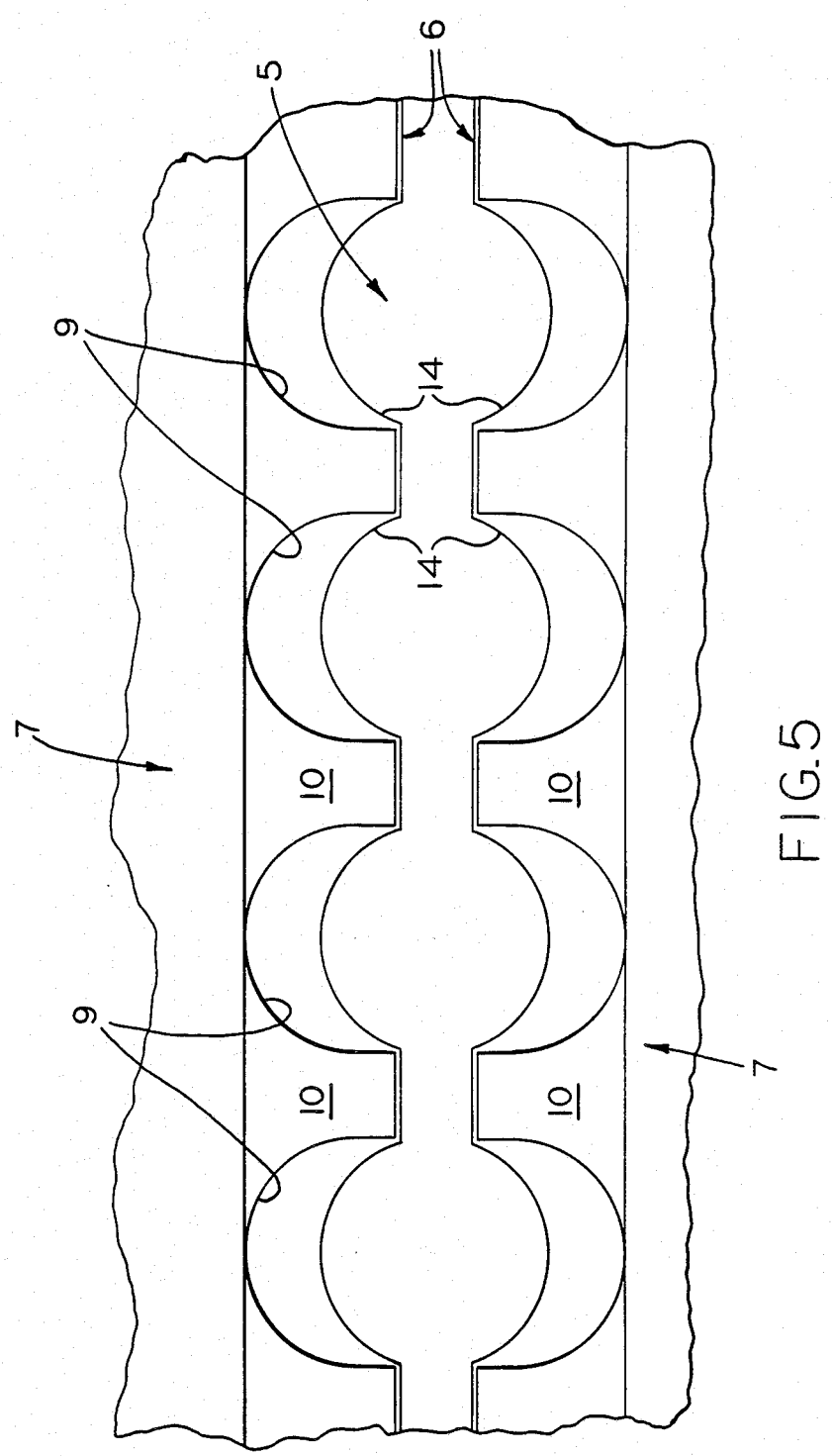

As shown in greater detail in FIGS. 4 and 5, each of the plates 7 is formed with a plurality of part-spherical depressions 9 extending in rows from a point just adjacent the front of the plate to a point well spaced from the rear of the plate. As shown in FIG. 2B and FIG. 4 the depressions 9 in adjacent rows are closely packed, so that adjacent depressions 9 are substantially equi-distantly spaced apart, by offsetting adjacent rows by half the spacing between the centres of adjacent depressions in each row. Connecting the depressions along each respective row is a groove 10 formed to the same depth as the depressions 9. For simplicity, the depressions 9 are shown only in the top pair of plates in FIG. 1 and, at that, only diagrammatically. FIGS. 4 and 5 illustrate the formation of the depressions and grooves more accurately as they are drawn to a larger scale.

To feed oxygen to the grooves 10 and depressions 9, manifold apertures 20 are formed in the front side edges of each plate as shown in FIG. 2B. Grooves 10' feeding the oxygen from the apertures to the front ends of the slots 10 and grooves 10" feeding the oxygen across the rear of the plate between the two sides of the U-shaped path.

The membrane 6 is laid-up in a sinuous path between the plates 7 as shown in FIG. 1 and each conduit 5 is formed in a U-shape as shown more particularly by FIG. 2 which illustrates, in plan, one side of one of the conduits formed by the membrane 6. The membrane 6 is held between the plates by rubber gaskets which press against the two membrane portions and squeeze them together to form a seal. At either end of the side portion of the conduit-forming membrane sheet 6 are fold lines 11,12 about which the membrane is folded at the front of the stack of plates and at the back respectively. The arrows B in FIG. 2 illustrate the flow path of blood from and to the inlet and outlet manifolds within the conduit formed by the two superimposed areas of the membrane 6 which lie between a respective pair of the plates 7. In longitudinally extending areas 13 the membrane is dimpled outwardly of the conduit, the dimples 14 being provided, as with the depressions in the plates 7, in longitudinally extending rows, adjacent rows being offset by half the distance between the centres of the dimples. The dimples 14 are preferably formed in the membrane prior to it being folded and stacked with the plates 7, but it is envisaged that when the membrane is formed of thermoplastic materials, the dimples could be formed in situ from an essentially planar membrane, by passing, for example hot water, under pressure through the conduits after initial assembly so as to stretch the membrane into the depressions 9 to form the dimples 14.

Longitudinal ribs 15 separate the adjacent longitudinal dimpled sections 13 and in the centre of the membrane a wider rib portion 16 is provided, the two sheet portions of the membrane 6 which form each side of a conduit being sealed to one another along this portion 16 so as to define the generally U-shaped path for the blood. Each of the plates 7 has a corresponding rib portion (not shown) of substantially the same length as the portion 16, the opposed rib portions on adjacent plates squeezing the membrane between them so as to produce the seal along the portion 16. Side portions 17 on each side of the conduit are likewise sealed between corresponding side portions of adjacent plates 7 to seal the edges of the conduit.

As indicated by the arrows O in FIG. 2, the flow of oxygen through the artificial lung also follows a U-shaped path around each conduit 5, the oxygen being fed from the apertures 20, through the grooves 10', under the dimpled portions 14, through the depressions 9 and the grooves 10, and across the undimpled portion 18 of the conduit through the grooves 10" and then back down a similar path on the other side. Oxygen is fed to the apertures through suitable ducts (not shown).

In the particular example shown the dimples in the membrane sheet 6 and the depressions 9 are arranged in alignment with one another so that, as shown in FIG. 5, the dimples 14 extend partly into the depressions 9. Each of the dimples and depressions has a diameter of substantially 1.5 mm., the dimples having a depth of 0.5 mm. and the depressions a depth of 1 mm., the grooves 10 having a width of 0.5 mm. and a depth, the same as the depressions, i.e. 1 mm. The portions of the plates 7 which have the depressions formed in them are spaced apart a distance of 0.5 mm.

In use, blood is pumped through the artificial lung preferably with a pulsatile flow, for example, by means of a pair of rolling-diaphragm piston pumps which may be located in the respective manifolds and which are operated in anti-phase to produce oscillating blood flow inside the lung. Blood will thus flow in a plurality of U-shaped paths through the conduits 5 formed by the folded membrane 6. The blood flows with a mean flow velocity through the conduits 5, but the superimposed reciprocatory component causes the blood alternately to accelerate and decelerate and this sets up eddies or vortices in the dimples 14 to promote intimate mixing of the blood and contact between the blood and the transfer membrane. At the same time oxygen is pumped in a steady stream through the housing in countercurrent to the flow of blood, also in U-shaped paths between the conduits 5 formed by the membrane and the plates 7. The countercurrent flow of oxygen produces good transfer through the membrane walls of the conduits.

I claim:

1. A membrane assembly, for use in mass or heat transfer apparatus, the assembly comprising a pair of generally parallel plates (7) spaced apart with a profiled surface of one plate facing a similarly profiled surface of the other plate; and a pair of sheets of transfer membrane material (6) closely spaced, throughout substantially their whole area, face to face between the plates with each sheet supported by and partially nesting in the profiled surface of the adjacent plate, to provide between the membranes a first conduit (5) for a first fluid and, between each sheet and the adjacent plate a second conduit for a second fluid; each sheet presenting in its surface facing the other sheet a regular close packed array of permanent dimple-like depressions (14), each facing and substantially aligned with a similar depression in the other sheet, whereby, in use, when the one fluid is passed through the first conduit (5) with a pulsatile flow, vortex mixing occurs in the depressions, the profiled surface of each of said plates comprising depressions in alignment with the depressions in the respective sheet partially nesting therein, and grooves (10) interconnecting adjacent said depressions in the plate, said grooves forming spaces between the respective sheet and plate profiled surface.

2. An assembly according to claim 1, wherein the depressions (14) in each sheet are provided in rows extending side by side to one another along the direction of mean flow through the conduit (5), the depressions (14) in adjacent rows being longitudinally offset halfway between adjacent depressions in the adjacent rows so that lateral nesting of adjacent rows occurs.

3. An assembly according to claim 1 or claim 2, wherein the depressions (9) in the plates (7) are arranged in longitudinal rows along the direction of mean flow along the assembly, the grooves (10) interconnecting one depression to the next along the respective row.

4. An assembly according to claim 1 or claim 2 wherein the depressions (9) in the plates (7) are part-spherical.

5. Apparatus for mass or heat transfer between first and second fluids, the apparatus comprising a membrane assembly according to claim 1, connected to both a first pumping means for pumping the first fluid through the first conduit with a pulsatile flow, and a second pumping means for pumping the second fluid through the second conduit.

* * * * *